US008769065B1

(12) United States Patent
Ninan et al.

(10) Patent No.: US 8,769,065 B1
(45) Date of Patent: Jul. 1, 2014

(54) METHODS AND APPARATUS FOR IMPLEMENTING A DATA MANAGEMENT FRAMEWORK TO COLLECT NETWORK MANAGEMENT DATA

(75) Inventors: Anoop George Ninan, Milford, MA (US); Samuil Shmuylovich, Framingham, MA (US)

(73) Assignee: EMC Corporation, Hopkinton, MA (US)

( * ) Notice: Subject to any disclaimer, the term of this patent is extended or adjusted under 35 U.S.C. 154(b) by 1793 days.

(21) Appl. No.: 11/540,096

(22) Filed: Sep. 29, 2006

Related U.S. Application Data

(63) Continuation-in-part of application No. 11/476,478, filed on Jun. 28, 2006.

(51) Int. Cl.
*G06F 15/173* (2006.01)

(52) U.S. Cl.
USPC .......................................................... 709/223

(58) Field of Classification Search
USPC ............... 709/223; 718/1, 100–108; 719/311, 719/316–320, 328–332
See application file for complete search history.

(56) References Cited

U.S. PATENT DOCUMENTS

| | | | | |
|---|---|---|---|---|
| 5,428,796 A * | 6/1995 | Iskiyan et al. | ................. | 710/240 |
| 5,778,411 A * | 7/1998 | DeMoss et al. | .................... | 711/4 |
| 6,018,743 A * | 1/2000 | Xu | ......................................... | 1/1 |
| 6,070,197 A * | 5/2000 | Cobb et al. | .................... | 719/315 |
| 6,076,077 A * | 6/2000 | Saito | ................................ | 705/51 |
| 6,122,639 A * | 9/2000 | Babu et al. | .............................. | 1/1 |
| 6,134,559 A * | 10/2000 | Brumme et al. | ....................... | 1/1 |
| 6,134,581 A * | 10/2000 | Ismael et al. | .................... | 709/202 |
| 6,199,195 B1 * | 3/2001 | Goodwin et al. | ............. | 717/104 |
| 6,256,676 B1 * | 7/2001 | Taylor et al. | .................... | 709/246 |
| 6,269,373 B1 * | 7/2001 | Apte et al. | ............................. | 1/1 |
| 6,282,568 B1 * | 8/2001 | Sondur et al. | ................. | 709/223 |
| 6,308,178 B1 * | 10/2001 | Chang et al. | ............................ | 1/1 |
| 6,363,421 B2 * | 3/2002 | Barker et al. | ................. | 709/223 |
| 6,539,388 B1 * | 3/2003 | Hattori et al. | ......................... | 1/1 |
| 6,615,241 B1 * | 9/2003 | Miller et al. | .................. | 709/206 |
| 6,701,359 B1 * | 3/2004 | Calabrez et al. | ............. | 709/223 |
| 6,947,939 B2 * | 9/2005 | Fujibayashi et al. | .................. | 1/1 |
| 6,950,874 B2 * | 9/2005 | Chang et al. | .................. | 709/229 |
| 6,957,234 B1 * | 10/2005 | Steinbach | .............. | 1/1 |
| 7,197,489 B1 * | 3/2007 | Gauvin et al. | ........................ | 1/1 |
| 7,228,453 B2 * | 6/2007 | O'Brien et al. | .................. | 714/13 |
| 7,860,838 B2 * | 12/2010 | Gupta et al. | .................. | 707/651 |
| 8,082,555 B2 * | 12/2011 | Hare et al. | .................... | 719/328 |
| 8,386,732 B1 * | 2/2013 | Ninan et al. | .................. | 711/163 |
| 2001/0039549 A1 * | 11/2001 | Eng et al. | ....................... | 707/205 |
| 2002/0165727 A1 * | 11/2002 | Greene et al. | ...................... | 705/1 |
| 2002/0188697 A1 * | 12/2002 | O'Connor | ..................... | 709/219 |
| 2002/0196744 A1 * | 12/2002 | O'Connor | ..................... | 370/254 |

(Continued)

*Primary Examiner* — Azizul Choudhury
*Assistant Examiner* — Tariq Najee-Ullah
(74) *Attorney, Agent, or Firm* — Krishnendu Gupta; Gerald P. Kazanjian

(57) ABSTRACT

A system receives identification of at least one data structure to contain the network management data associated with the managed resource. The system receives notification that at least one type adapter structure has been created. The type adapter is associated with the data structure. The system receives identification of at least one key common to the data structure, and the network management data. The system receives notification that methods within the at least one type adapter structure have been implemented to enable the network management data to be mapped from the at least one data structure to a managed object database.

20 Claims, 9 Drawing Sheets

(56) References Cited

U.S. PATENT DOCUMENTS

| | | |
|---|---|---|
| 2003/0177239 A1* | 9/2003 | Shinohara et al. ............ 709/226 |
| 2003/0210269 A1* | 11/2003 | Luo ............................. 345/763 |
| 2004/0128644 A1* | 7/2004 | Hurst et al. ................... 717/100 |
| 2005/0005066 A1* | 1/2005 | Nakayama et al. ........... 711/117 |
| 2005/0071470 A1* | 3/2005 | O'Brien et al. ............... 709/226 |
| 2005/0193105 A1* | 9/2005 | Basham et al. ............... 709/223 |
| 2005/0278692 A1* | 12/2005 | Sridhar et al. ................ 717/106 |
| 2006/0004765 A1* | 1/2006 | Anderson et al. ............... 707/10 |
| 2006/0004856 A1* | 1/2006 | Shen et al. ................ 707/103 Y |
| 2006/0053380 A1* | 3/2006 | Spataro et al. ................ 715/753 |
| 2007/0209043 A1* | 9/2007 | Hare et al. .................... 719/330 |

* cited by examiner

210 RECEIVE NOTIFICATION THAT A HIERARCHY HAS BEEN IDENTIFIED, THE HIERARCHY ASSOCIATED WITH THE MANAGED RESOURCE

211 VALIDATE IMPLEMENTATION OF AT LEAST ONE INSTANCE OF THE AT LEAST ONE TYPE ADAPTER STRUCTURE BASED ON THE HIERARCHY ASSOCIATED WITH THE MANAGED RESOURCE, THE HIERARCHY INDICATING AN ORDER IN WHICH THE AT LEAST ONE INSTANCE OF THE AT LEAST ONE TYPE ADAPTER STRUCTURE IS IMPLEMENTED WITH RESPECT TO AT LEAST ONE OTHER INSTANCE OF THE AT LEAST ONE TYPE ADAPTER STRUCTURE

OR

212 RECEIVE NOTIFICATION THAT AT LEAST ONE RELATED TYPE ADAPTER STRUCTURE ASSOCIATED WITH THE AT LEAST ONE TYPE ADAPTER STRUCTURE HAS BEEN IDENTIFIED, CREATION OF THE AT LEAST ONE RELATED TYPE ADAPTER STRUCTURE REQUIRED FOR THE NETWORK MANAGEMENT DATA TO BE MAPPED FROM THE AT LEAST ONE DATA STRUCTURE TO A MANAGED OBJECT DATABASE

213 VALIDATE CREATION OF THE AT LEAST ONE RELATED TYPE ADAPTER STRUCTURE ASSOCIATED WITH THE AT LEAST ONE TYPE ADAPTER STRUCTURE

214 VALIDATE MODIFICATION OF A METHOD TO CONFIRM EXISTENCE OF THE AT LEAST ONE RELATED TYPE ADAPTER STRUCTURE PRIOR TO CREATION OF THE AT LEAST ONE TYPE ADAPTER STRUCTURE

*FIG. 6*

215 RECEIVE NOTIFICATION THAT A HIERARCHY HAS BEEN IDENTIFIED, THE HIERARCHY ASSOCIATED WITH THE MANAGED RESOURCE

216 RECEIVE NOTIFICATION THAT AT LEAST ONE FOREIGN TYPE ADAPTER STRUCTURE ASSOCIATED WITH THE AT LEAST ONE TYPE ADAPTER STRUCTURE HAS BEEN IDENTIFIED, THE AT LEAST ONE FOREIGN TYPE ADAPTER STRUCTURE ASSOCIATED WITH AT LEAST ONE OTHER MANAGED RESOURCE THAT MAINTAINS A RELATIONSHIP WITH THE MANAGED RESOURCE FOR WHICH THE AT LEAST ONE DATA STRUCTURE CONTAINS THE NETWORK MANAGEMENT DATA

↓

217 VALIDATE CREATION OF THE AT LEAST ONE FOREIGN TYPE ADAPTER STRUCTURE ASSOCIATED WITH THE AT LEAST ONE TYPE ADAPTER STRUCTURE

OR

218 VALIDATE IMPLEMENTATION OF THE AT LEAST ONE KEY BASED ON A HIERARCHY ASSOCIATED WITH THE MANAGED RESOURCE, THE HIERARCHY INDICATING AN ORDER IN WHICH THE AT LEAST ONE KEY IS IMPLEMENTED WITH RESPECT TO AT LEAST ONE OTHER KEY

*FIG. 7*

218 VALIDATE IMPLEMENTATION OF THE AT LEAST ONE KEY BASED ON A HIERARCHY ASSOCIATED WITH THE MANAGED RESOURCE, THE HIERARCHY INDICATING AN ORDER IN WHICH THE AT LEAST ONE KEY IS IMPLEMENTED WITH RESPECT TO AT LEAST ONE OTHER KEY

219 DETECT CREATION OF A CONSTRUCTOR THAT ACCEPTS, AS A PARAMETER, AN IDENTIFYING MEMBER OF THE AT LEAST ONE KEY THAT ASSOCIATES THE AT LEAST ONE KEY WITH THE DATA STRUCTURE

220 RECEIVE IDENTIFICATION OF A UNIQUE IDENTIFIER ASSOCIATED WITH THE MANAGED RESOURCE, AS THE PARAMETER

OR

221 RECEIVE IDENTIFICATION OF AT LEAST ONE PARENT KEY ASSOCIATED WITH THE AT LEAST ONE KEY, THE PARENT KEY AND THE AT LEAST ONE KEY HAVING A HIERARCHICAL RELATIONSHIP

*FIG. 8*

METHODS AND APPARATUS FOR IMPLEMENTING A DATA MANAGEMENT FRAMEWORK TO COLLECT NETWORK MANAGEMENT DATA

CONTINUATION-IN-PART CLAIM TO PRIORITY

This application is a continuation-in-part of, and claims the benefit of the filing date of co-pending United States Application for Patent having Ser. No. 11/476,478 filed Jun. 28, 2006 entitled "METHODS AND APPARATUS FOR STORING COLLECTED NETWORK MANAGEMENT DATA". The entire teachings and contents of this application are hereby incorporated by reference in their entirety.

BACKGROUND

The rapid expansion of information service and data processing industries has resulted in a need for computer systems to manage and store large amounts of data. As an example, financial service industry businesses such as banks, mutual fund companies or the like often operate complex data processing systems that require access to many hundreds of gigabytes or even terabytes of data. Data storage system developers have responded to these types of data storage requirements by integrating large capacity data storage systems, data communications devices and computer systems into networks called "storage networks" or "storage area networks" (SANs.) A storage area network is a collection of data storage systems that are networked with a number of host computer systems that operate as servers to access data stored in the data storage systems. Components of a typical conventional storage area network implementation include one or more connectivity devices such as high speed data switches that interconnect the various data storage systems to each other and to one or more host or server computer systems (servers) that require access to (e.g., read and/or write) the data in the data storage systems on behalf of client software applications and/or client computer systems to communicate with the servers. A SAN is thus a fabric that routes input/output requests in data access protocols such as SCSI, iSCSI, Fiberchannel, or others from servers through switches to one or more data storage systems for access to data stored in those storage systems.

A developer or administrator of a storage area network environment may install one or more distributed storage area network management software applications within the storage area network to manage or administer the various resources (i.e., devices, computer systems, storage systems, etc.) that operate within the storage area network. A network manager (i.e., a person) responsible for management of the storage area network operates the network management software application to perform management tasks such as performance monitoring, network analysis, remote configuration, storage provisioning and other administration of the various resources operating within the storage area network.

A typical conventional storage area network management software application may have several different software components or processes that execute independently of each other in a distributed manner on different computer systems but that collectively interoperate together to perform network management. As an example, conventional designs of storage area network management applications can include console, server, agent and storage or database management software components or processes that each performs a specific role in storage area network management.

Generally, the server component or process operates as a central control process within the storage area network management application and coordinates communication between the console, storage and agent components. The console component or process often executes within a dedicated storage area network management workstation to allow a network administrator (i.e., a person or people responsible for management of the storage area network) to visualize and remotely control and manage the various components within the storage area network that are displayed on a graphical user interface within a display on the console computer system. Agent components or processes execute on the various host computer systems such as servers distributed throughout the storage area network to manage various types of storage area network resources.

As an example, there may be different respective agents specifically designed (e.g., coded in software) to remotely manage, control and collect data from data storage system resources, database applications, switches, and so forth. Agents receive remote management commands from the server (i.e., via a user at the console controlling the server) and apply functionality associated with those management commands to the managed resources within the storage area network for which those agents are designated to manage. Agents are also responsible for periodically (e.g. nightly) collecting configuration or management data concerning the storage area network resources that those agents are responsible for managing. As an example, an agent that is responsible for monitoring and control of a large data storage disk array system might be configured to collect management data from that storage array on a nightly basis. This agent data collection process might include communicating with the storage array to query the array for information concerning all devices (e.g. logical storage devices) configured at that time within the array. This may result in the collection of large amounts of management data from certain managed SAN resources, such as large storage array in which there can be many thousands of devices configured for operation. The management data collected from the agent is also known as agent data.

Agents transmit this collected agent data back to an assigned storage component, also known as a store process. The store process receives the collected agent data from the agent and processes and stores this information into a storage area network management database for access by the server and console components. The management database thus provides managed object data (i.e., agent data that has been stored in the management database) for all managed resources in the SAN. The console component can interact with the server component to obtain current network information such as performance, capacity, load or other data concerning managed resources within the storage area network by accessing the managed object data maintained in this manner within the network management database.

The design of conventional network management applications often uses a large number of agent components that each remotely operate to periodically collect sets of management data from the managed resources that those agents manage. After collection, each agent is responsible for transmitting the collected set of management data to a store process that processes the management data for storage into a management database or other accessible management data repository. More specifically, an agent responsible to interact with that managed resource collects and forwards management data associated with that data storage system to the store process for placement into the management database. The store process receives the entire set of collected management data and converts each field of this data from one data type or arrangement to another and then places this data into the network management database.

A data management framework provides an efficient method for processing and storing network management data collected from a managed resource by an agent. The framework provides a set of adapter classes that allow store processing to efficiently process agent data collected from managed resources. During operation of the store process disclosed herein, the store process obtains agent data collected by an agent from a managed resource in a network and populates a set of adapters with the agent data. The store process determines the set of adapters to be instantiated from the agent data collected from the managed resource. In particular, the store process identifies and instantiates at least one type adapter associated with the agent data collected from the managed resource. As an example, the type adapter may correspond to a resource such as a storage array from which the agent data was collected.

For each type adapter, the framework provides instance adapters and the store process instantiates at least one associated instance adapter to contain agent data associated with that type adapter. In this manner, instance adapters operate as containers for the collected management data and are associated to type adapters that correspond to managed resources from which that agent data was collected. The store process can validate the data within the instance adapters to be certain that the data is complete for processing into a managed object database access by the network management application. By performing validation, the store process ensures that cumbersome database access operations are avoided in situations when agent data is corrupted or incomplete in some manner.

Assuming the validation succeeds, the store process begins the operation of storing the agent data as managed object data within the management database maintained by the network management application. To do so, based on the set of adapters populated with the agent data, the store process selects and applies at least one of a plurality of read mechanisms to read corresponding managed object data from a management database into managed objects that are to be synchronized with the agent data collected from the managed resource. To be most efficient, the store process selects a read mechanism that reads only managed object data that corresponds to the agent data.

Using the selected read mechanism, the store process reads from the management database and stores the managed object data read from the management database using the invoked read mechanism in a managed object structure for comparison with the agent data maintained in the instance adapters. Using the agent data being maintained in the instance adapters and the managed object data being maintained in memory from application of the read mechanism, the store process thereafter synchronizes the agent data populated in the set of adapters with the managed object data in the management database.

The store process can create new managed objects for agent data stored in instance adapters that does not have corresponding managed object data read from the management database. Likewise, the store process deletes managed objects for which managed object data was read from the management database but for which there is no corresponding agent data maintained in at least one instance adapter. The store process also associates specific instance adapters containing agent data that map to specific managed objects read from the management database using key information that is common between the agent data and object data read from the database. Once instance adapters are matched to managed object structures, the store process copies properties of each instance adapter that maps to a specific managed object into corresponding properties of that managed object. Thereafter, the store process commits the managed object data in the managed objects to the management database. Agent designers and developers create an agent data structure, from scratch, that will be used to transfer of management data collected by the agent (i.e., agent data) for transmission to a store process. Likewise, the store process itself must be modified to be able to processes each newly created agent data structure for each new type of networked managed resource (e.g. each new device that must be managed in a network).

SUMMARY

Conventional mechanisms and techniques for managing the collection and processing of management data for managed resources by network management applications suffer from a variety of deficiencies. In particular, the design of conventional network management applications requires agent designers and developers to create the data structures and methods necessary to facilitate the processing and storing of network management data collected from a managed resource by an agent. For each newly introduced managed resource, a developer must create the necessary type adapter structures and object key structures, as well as methods related to these structures, and then implement those structures and methods accordingly. Creating the necessary data structures and methods is time consuming, and can introduce errors into the data management framework if not performed properly.

Embodiments disclosed herein operate to significantly overcome these and other deficiencies associated with conventional mechanisms and techniques for introducing new managed resources into the data management framework to collect management data in a network management application. In particular, embodiments disclosed herein provide a data management framework implementing process that enables a data management framework to collect network management data from a newly added managed resource.

Using the data management framework implementing process, a developer identifies a unique service name for new transactions, or moves a known service name from its original known location. For the managed resource (i.e., the newly added managed resource), the developer enumerates all combinations of data structures (associated with the service name) containing managed object data received from an agent. Each data structure requires creation of at least two structures; a key structure and a type adapter structure for the managed resource(s) for which the data structure contains managed object data. Depending on the type of managed resource, and a hierarchy associated with that managed resource, it may be necessary to create more than one pair of a key structure and a type adapter structure. For example, a data structure containing data associated with a newly added SymDevice managed resource requires creation of both SymDevice adapters/SymDevice Key and StorageDevice adapters/StorageDevice key structures. The developer then creates a new type adapter base class with default implementation for each of the managed resources identified. As new type adapter structures are added to the framework, this new type adapter base class is updated with information associated with the new type adapter structures.

The developer then implements the key structures and the type adapter structures. These structures are developed in order according to a hierarchy associated with the managed resources. As the key structures and the type adapter structures are created and implemented, the developer tests the methods in the structures to insure all are executing correctly.

The data management framework implementing process receives identification of at least one data structure to contain the network management data associated with the managed resource, and receives notification that at least one type adapter structure has been created. The type adapter is associated with the data structure. The data management framework implementing process receives identification of at least one key common to the data structure and the network management data, and receives notification that methods within the type adapter structure have been implemented to enable the network management data to be mapped from data structure to a managed object database. The data management framework implementing process receives identification of a non-managed resource requiring network management data collection within the data management framework, and provides a development framework that allows an application developer to introduce network management data collection of the non-managed resource, into the data management framework, by identifying components associated with the development framework. The components are identified by performing at least one of:

i) identifying the at least one data structure;
ii) creating the at least one type adapter;
iii) identifying the at least one key; and
iv) implementing methods within the at least one type adapter.

The data management framework implementing process operates the development framework so that the non-managed resource becomes a managed resource via the collection of network management data within the data management framework.

Other embodiments disclosed herein include any type of computerized device, workstation, handheld or laptop computer, or the like configured with software and/or circuitry (e.g., a processor) to process any or all of the method operations disclosed herein. In other words, a computerized device such as a computer or a data communications device or any type of processor that is programmed or configured to operate as explained herein is considered an embodiment disclosed herein.

Other embodiments disclosed herein include software programs to perform the steps and operations summarized above and disclosed in detail below. One such embodiment comprises a computer program product that has a computer-readable medium including computer program logic encoded thereon that, when performed in a computerized device having a coupling of a memory and a processor, programs the processor to perform the operations disclosed herein. Such arrangements are typically provided as software, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein as embodiments disclosed herein.

It is to be understood that the system disclosed herein may be embodied strictly as a software program, as software and hardware, or as hardware alone. The features disclosed herein may be employed in data communications devices and other computerized devices and software systems for such devices such as those manufactured by EMC, Inc., of Hopkinton, Mass.

BRIEF DESCRIPTION OF THE DRAWINGS

The foregoing and other objects, features and advantages disclosed herein will be apparent from the following more particular description of preferred embodiments disclosed herein, as illustrated in the accompanying drawings in which like reference characters refer to the same parts throughout the different views. The drawings are not necessarily to scale, with emphasis instead being placed upon illustrating the embodiments, principles and concepts disclosed herein.

FIG. 6 illustrates a flowchart of a procedure performed by the system of FIG. 1 when the data management framework implementing process receives notification that a hierarchy has been identified, the hierarchy associated with the managed resource, according to one embodiment disclosed herein.

FIG. 7 illustrates a flowchart of a procedure performed by the system of FIG. 1 when the data management framework implementing process receives notification that a hierarchy has been identified, and receives notification that at least one foreign type adapter structure associated with the at least one type adapter structure has been identified, according to one embodiment disclosed herein.

FIG. 8 illustrates a flowchart of a procedure performed by the system of FIG. 1 when the data management framework implementing process validates implementation of the at least one key based on a hierarchy associated with the managed resource, according to one embodiment disclosed herein.

DETAILED DESCRIPTION

Figure 1:
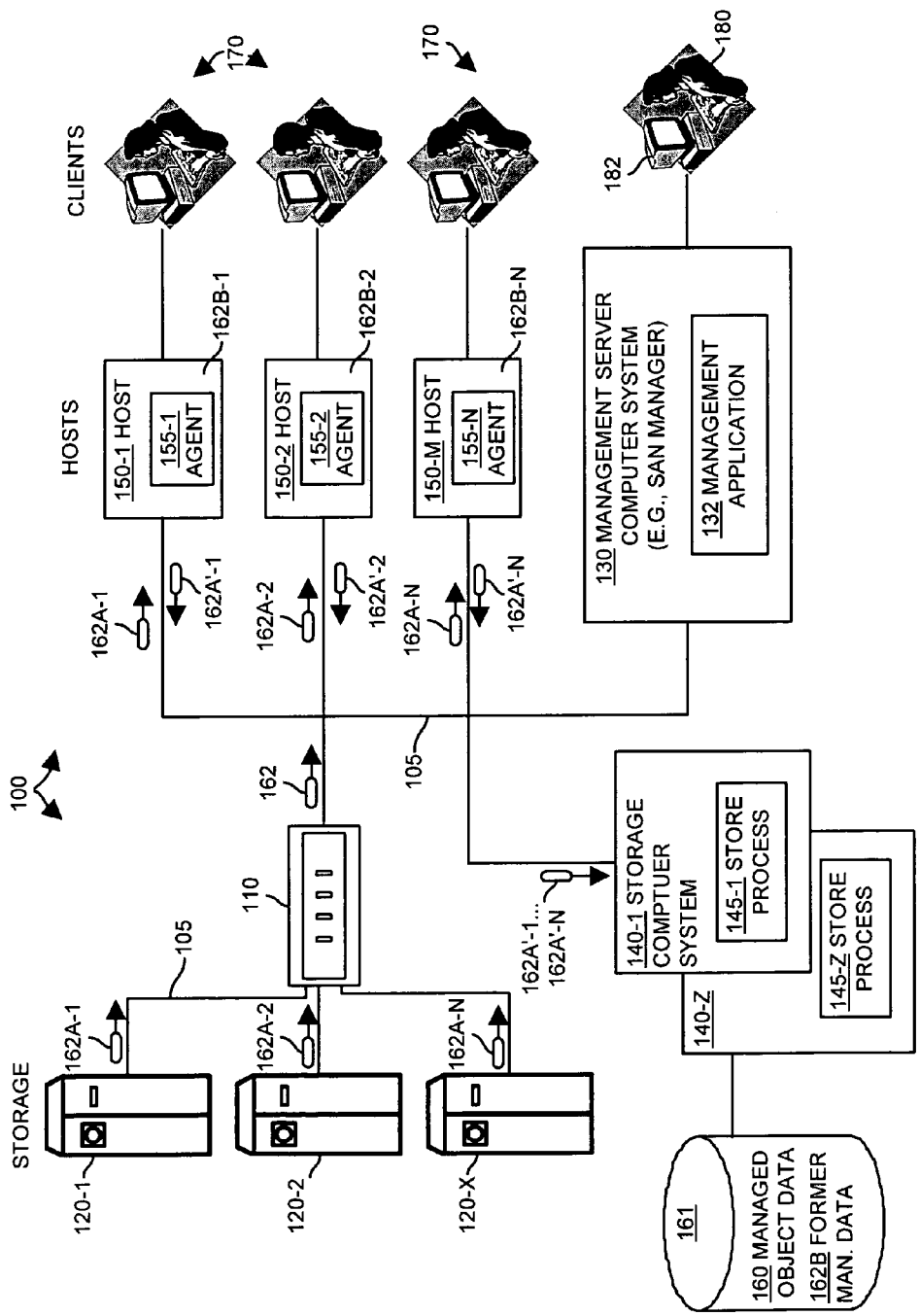
FIG. 1 illustrates an example storage area network and computing system environment including the data management framework implementing process configured to operate according to embodiments disclosed herein.

Embodiments disclosed herein include methods and a computer system that perform a data management framework implementing process within a data management framework. The data management framework implementing process enables a data management framework to collect network management data from a newly added managed resource. Using the data management framework implementing process, a developer identifies a unique service name for new transactions, or moves a known service name from its original known location. For the managed resource (i.e., the newly added managed resource), the developer enumerates all combinations of data structures (associated with the service name) containing managed object data received from an agent. Each data structure requires creation of at least two structures, a key structure and a type adapter structure for the managed resource(s) for which the data structure contains managed object data. Depending on the type of managed resource and a hierarchy associated with that managed resource, it may be necessary to create more than one pair of a key structure and a type adapter structure. For example, a data structure containing data associated with a newly added SymDevice managed resource requires creation of both SymDevice adapters/SymDevice Key and StorageDevice adapters/StorageDevice key structures. The developer then creates a new type adapter base class with default implementation for each of the managed resources identified. As new type adapter structures are added to the framework, this new type adapter base class is updated with information associated with the new type adapter structures. The developer then implements the key structures and the type adapter structures. These structures are developed in order according to a hierarchy associated with the managed resources. As the key structures and the type adapter structures are created and implemented, the developer tests the methods in the structures to insure all are executing correctly.

The data management framework implementing process receives identification of at least one data structure to contain the network management data associated with the managed resource, and receives notification that at least one type adapter structure has been created. The type adapter is associated with the data structure. The data management framework implementing process receives identification of at least one key common to the data structure and the network management data, and receives notification that methods within the type adapter structure have been implemented to enable the network management data to be mapped from data structure to a managed object database. The data management framework implementing process receives identification of a non-managed resource requiring network management data collection within the data management framework, and provides a development framework that allows an application developer to introduce network management data collection of the non-managed resource, into the data management framework, by identifying components associated with the development framework. The components are identified by performing at least one of:

i) identifying the at least one data structure;
    ii) creating the at least one type adapter;
    iii) identifying the at least one key; and
    iv) implementing methods within the at least one type adapter.

The data management framework implementing process operates the development framework so that the non-managed resource becomes a managed resource via the collection of network management data within the data management framework.

FIG. 1 illustrates an example of a networking environment suitable for use in explaining example embodiments. In this example, the networking environment is a storage area network 100 that includes a communications medium 105 that interconnects a plurality of data storage systems 120-1 through 120-X through one or more connectivity devices 110 (e.g., storage area network switches) to a plurality of host computer systems 150-1 through 150-M. According to the general operation of the storage area network shown in FIG. 1, client computer systems 170 can operate various client software applications (not specifically shown) that communicate with server applications (not specifically shown) operating within the host computer systems 150 in order to access data stored within the data storage systems 120 over the storage area network 100. The system disclosed herein is concerned with management of the various hosts 150, switches 110, and data storage systems 120 with a network management application 132 that includes store processes 145 and agent processes 155.

Figure 2:
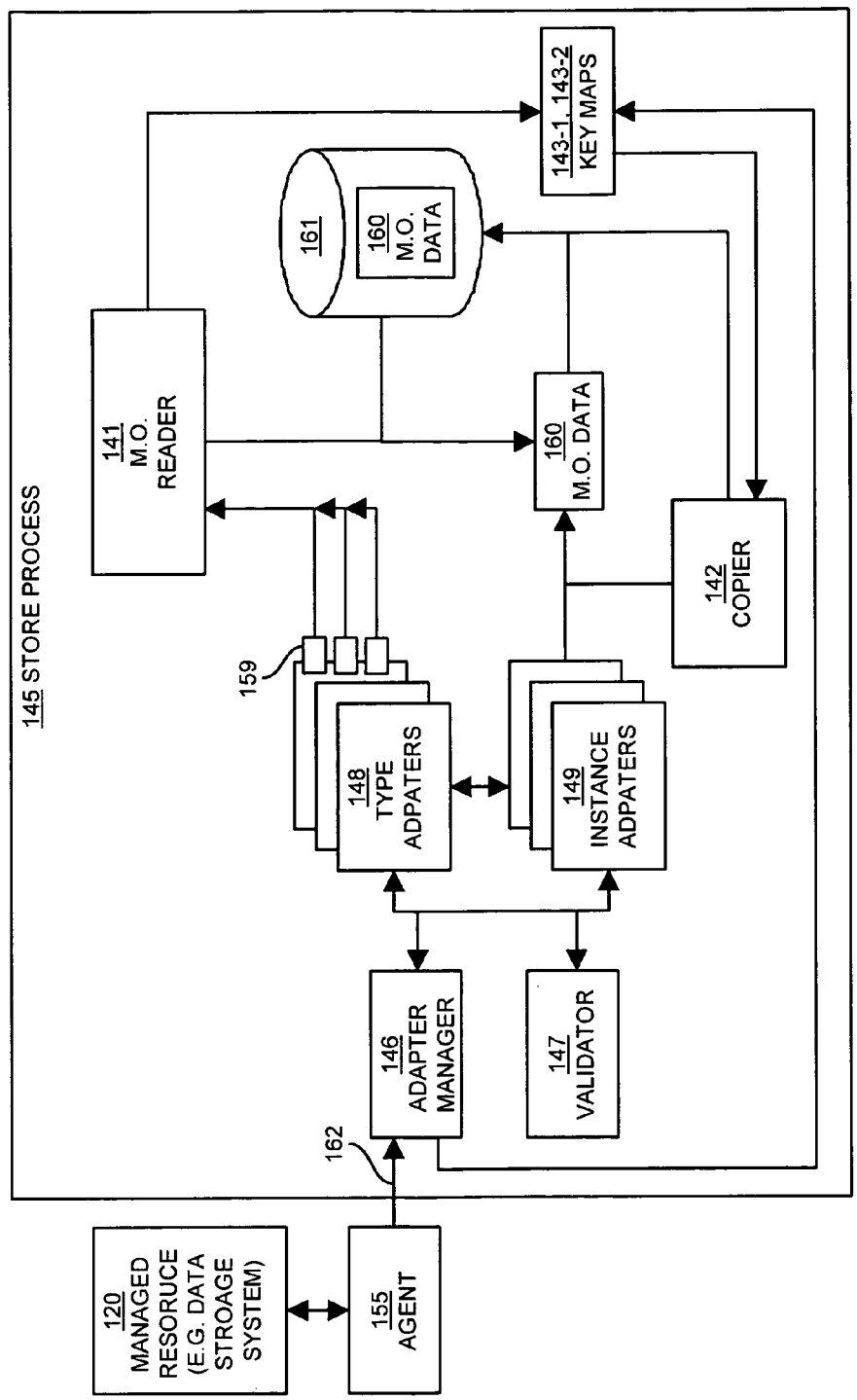
FIG. 2 illustrates an example architecture of a store process configured to operate according to embodiments disclosed herein.

More specifically, in this example storage area network 100 is a management server computer system 130 that operates the network management application 132. In addition, the storage area network 100 includes one or more storage computer systems 140-1 through 140-Z that operate respective store processes 145-1 through 145-Z configured in accordance with the framework disclosed herein. A plurality of agent software processes 155-1 through 155-N operate within one or more of the host computer systems 150-1 through 150-M to periodically collect agent data 162 from managed resources such as the data storage systems 120, connectivity device 110 and hosts 150 (or any other managed resources that may operate in the SAN 100. The agents 155 process the collected agent data (e.g. to determine changes from the time of last collection) and then transmit the collected agent data to the store processes 145. Generally, the agents 155 and store processes 145 interoperate with, and are collectively considered parts of the management application 132. A network administrator 180 interacts via a console computer system 182 with the management application 132 executing on the management server computer system 130 in order to remotely administer manageable entities within the storage area network 100 such as the data storage systems 120, the connectivity devices 110 and the host computer systems 150. Embodiments disclosed herein relate to the processing performed by the store processes 145 to collect and process agent data 162 collected by agents 155 from managed entities (e.g., 120 and/or 110 and others not specifically shown) for placement into the management database 161 as managed object data 160 for access by the management application 132. FIG. 2 illustrates a more detailed view of processing performed according to store processes 145.

FIG. 2 is a block diagram of an example store process 145 architecture that operates in accordance with example embodiments disclosed herein. Generally, as shown in this example, the agent 155 collects agent data 162 from a managed resource 120 that, in this example, is a storage array operating in a storage area network 100. The agent 155 transmits the agent data 162 to the store process 145 for receipt by an adapter manager 146. The agent data 162 may be encapsulated in a predefined data format. The adapter manager 146 is able to analyze the agent data 162 to identify which managed resource 120 the agent data 162 was collected from by the agent 155. From this analysis, the adapter manager 146 can instantiate a set of adapters including type adapters 148 and instance adapters 149, and can further instantiate the agent data 162 into appropriate instance adapters 149 as will be explained more detail. The type adapters 148 generally correspond to various resources for which the agent data 162 was collected and the instance adapters 149 serve as containers to maintain the specific contents, values or properties contained within the collected agent data 162 for those resources. During the process of populating the adapters with agent data 162, the adapter manager 146 creates an instance adapter map 143-1 to identify specific key information within fields of the agent data 162 that correspond to key information within managed object data 160 maintained in the management database 161.

After the adapter manager 146 has instantiated the appropriate type and instance adapters 148 and 149, the store process 145 operates a validator 147 to validate the data within the instance adapters 149. Validation ensures that the collected agent data 162 is process-able for storage within the managed object database 161. Validation can include insuring that all references within agent data have corresponding adapters instantiated so that all relationships between fields of data are present. Assuming validation is successful (if it is not, the processing aborts), the store process 145 operates a managed object reader 141 to read managed object data 160 from the management database 161. During reading of the managed object data 160, the managed object reader 141 creates a managed object data key map 143-2 that identifies keys within specific managed object 160. The managed object data 160 that is read from the management database 161 represents management data that is to be updated with the most recently collected agent data 162 that resides in the instance adapters 149.

After reading the managed object data 160, the store process 145 operates a copier 142 to associate the agent data maintained within the instance adapters 149 with the managed object data 160 read from the management database 161. This processing uses the key maps 143-1 and 143-2 and can include creation of new managed objects 160 or deletion of old managed objects 160 that are no longer represented or reflected within the agent data 162 in the instance adapters 149. Additionally, the copier 142 establishes any required relationships and copies the properties of matching instance adapters 149 to the appropriate managed object 160. The copier 142 accesses the maps 143 to complete this process. After the copy processes complete, the copier 142 causes the newly updated managed object data 160 (i.e., now updated with the agent data 162 in the store process 145) to be committed for storage within the management database 161. Further details of the processing in accordance with example embodiments will now be described in a series of flowcharts.

Figure 3:
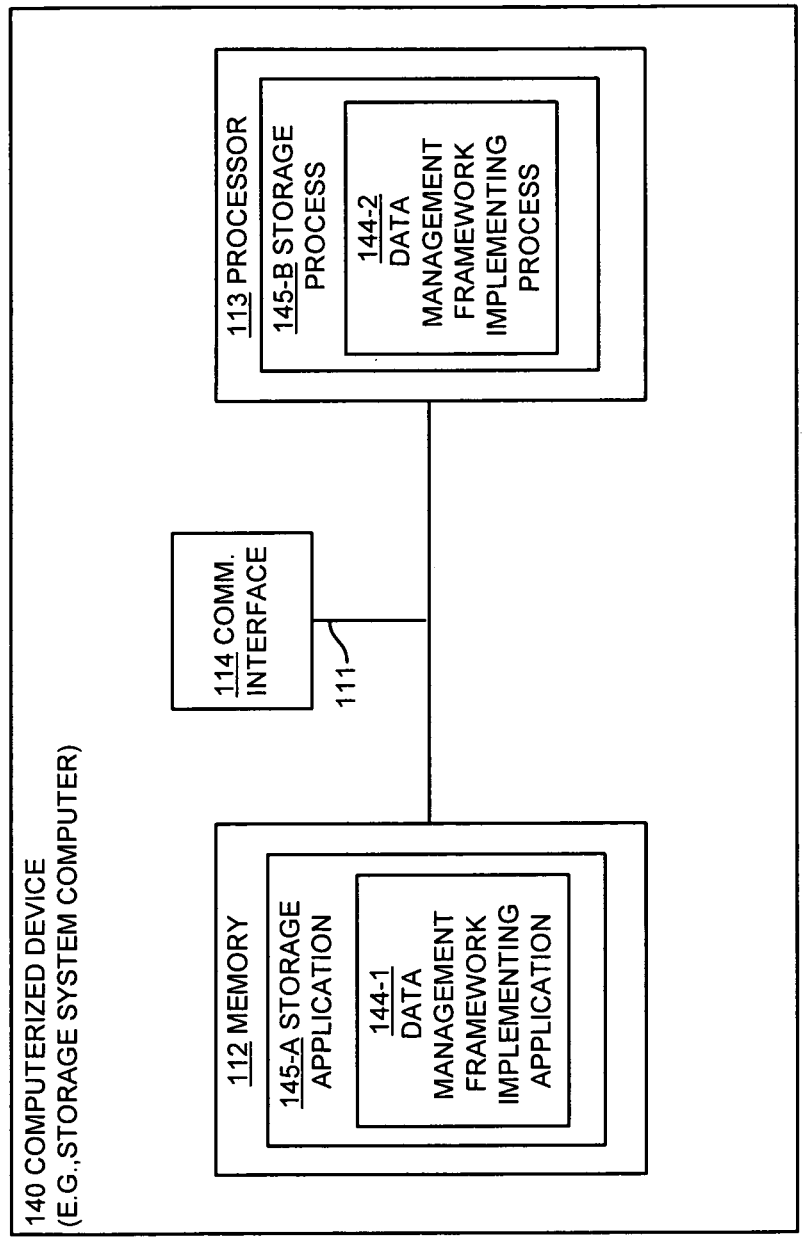
FIG. 3 illustrates an example computer system architecture for either a host computer system that operates an agent or a storage computer system that operates a data management framework implementing process in accordance with embodiments disclosed herein.

FIG. 3 illustrates an example architecture of a computer system that is configured as a storage computer system 140. The computer system 140 may be any type of computerized system such as a personal computer, workstation, portable computing device, mainframe, server or the like. In this example, the computer system 140 includes an interconnection mechanism 111 that couples a memory system 112, a processor 113, and a communications interface 114. The communications interface 114 allows the computer systems 140 and 150 to communicate with each other over the storage area network 100.

The memory system 112 may be any type of computer readable medium that is encoded with an application 145-A containing a data management framework implementing application 144-1 that represents software code such as data and/or logic instructions (e.g., stored in the memory or on another computer readable medium such as a disk) that embody the processing functionality of embodiments of the store process 145 as explained above. The processor 113 can access the memory system 112 via the interconnection mechanism 111 in order to launch, run, execute, interpret or otherwise perform the logic instructions of the application 145 (for the storage computer) in order to produce a corresponding store process 145-B containing a data management framework implementing process 144-2. In other words, the store processes 145-B represents one or more portions of the storage application 145-A1 performing within or upon the processor 113 in the computer system.

Is to be understood that embodiments disclosed herein include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 112 (e.g., within random access memory or RAM). It is also to be understood that other embodiments disclosed herein can provide the applications operating within the processor 113 as the processes. While not shown in this example, those skilled in the art will understand that the computer system may include other processes and/or software and hardware components, such as an operating system, which have been left out of this illustration for ease of description.

Further details of configurations explained herein will now be provided with respect to a flow chart of processing steps that show the high level operations disclosed herein to perform the data management framework implementing process 144-2.

Figure 4:
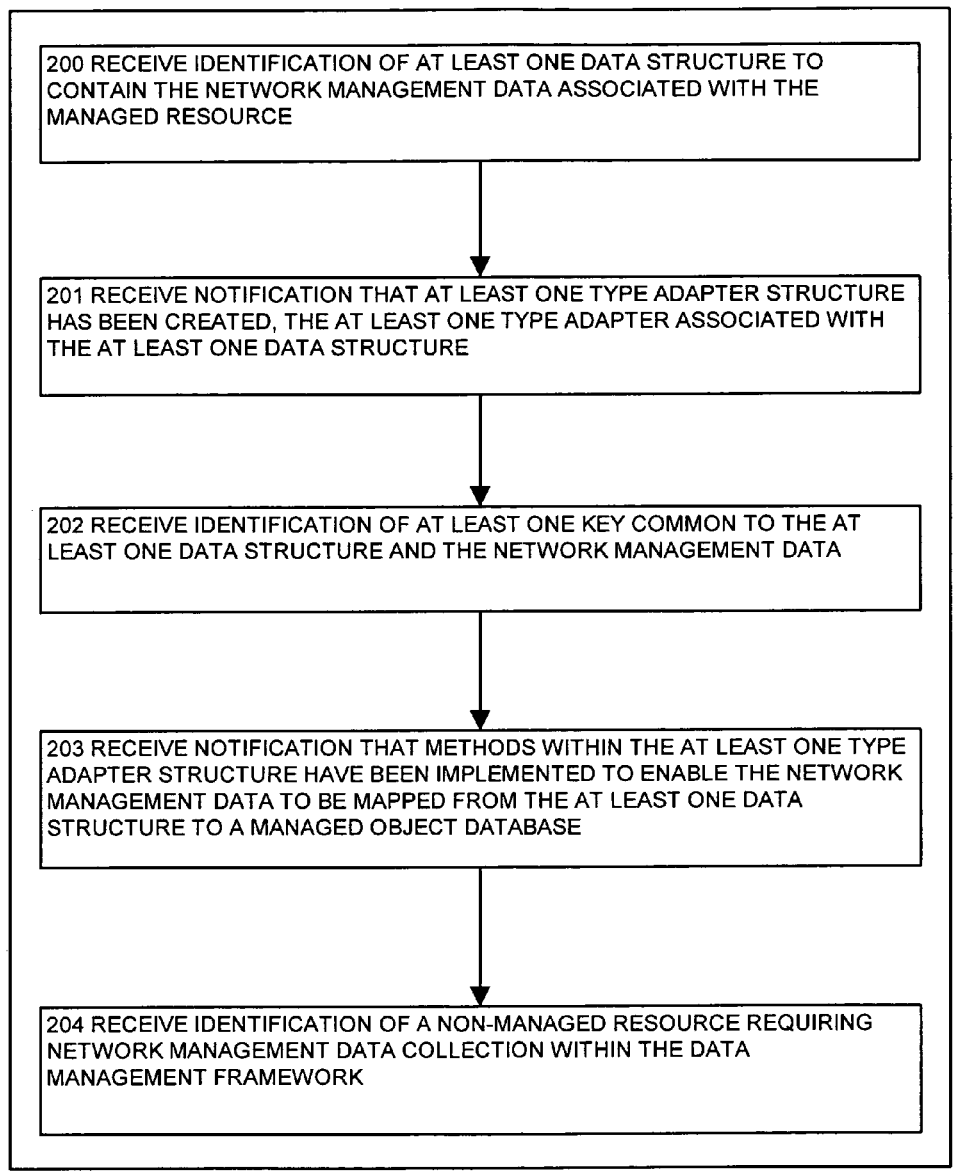
FIG. 4 illustrates a flowchart of a procedure performed by the system of FIG. 1 when the data management framework implementing process receives identification of at least one data structure to contain the network management data associated with the managed resource, according to one embodiment disclosed herein.

FIG. 4 is a flowchart of the steps performed by the data management framework implementing process 144-2 when it receives identification of at least one data structure to contain the network management data associated with the managed resource 120.

In step 200, the data management framework implementing process 144-2 receives identification of at least one data structure to contain the network management data associated with the managed resource 120. In an example embodiment, an agent 155 receives network management data from the managed resource 120. The network management data is received by the data management framework implementing process 144-2 in a data structure.

In step 201, the data management framework implementing process 144-2 receives notification that at least one type adapter structure 148 has been created. The type adapter is associated with the data structure. An application developer identifies managed resource 120 that has been newly added to the data management framework, and creates one or more type adapter structures 148 for that newly added managed resource 120.

In step 202, the data management framework implementing process 144-2 receives identification of at least one key common to the data structure, and the network management data. For each newly added managed resource 120, an application developer creates a key structure. The key structure contains data that links the network management data received from newly added managed resource 120, via the agent 155, to the data structure received by the data management framework implementing process 144-2.

In step 203, the data management framework implementing process 144-2 receives notification that methods within the type adapter structure 148 have been implemented to enable the network management data to be mapped from the data structure to a managed object database 161. After an application developer creates the type adapter structure 148 and the key structure associated with the managed resource 148, the application developer implements methods associated with the type adapter structure 148 and the key structure.

In step 204, the data management framework implementing process 144-2 receives identification of a non-managed resource 148 requiring network management data collection within the data management framework. In an example embodiment, when an application developer adds a managed resource 148 to the data management framework, the data management framework implementing process 144-2 receives identification that a new managed resource 148 has been added.

Figure 5:
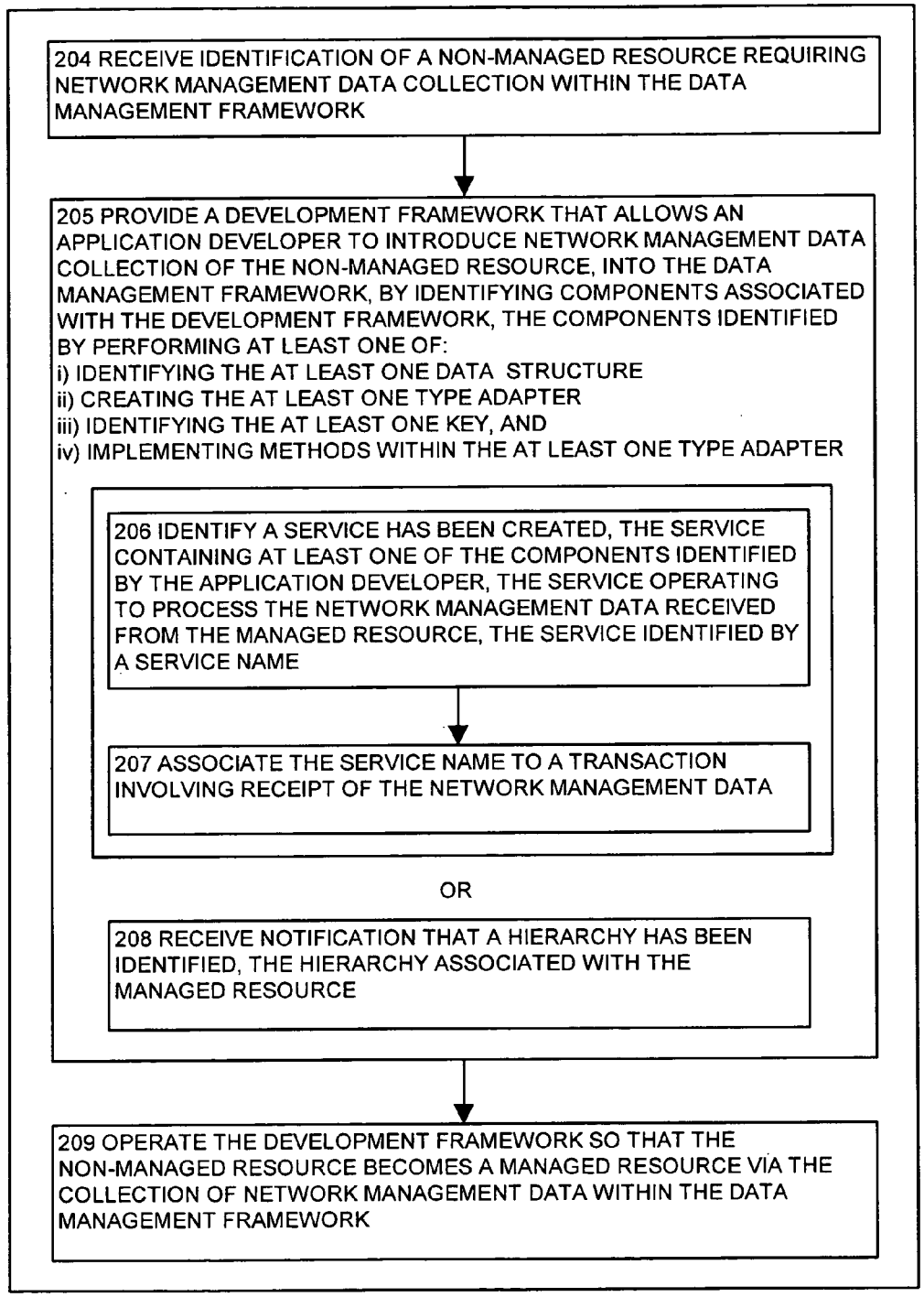
FIG. 5 illustrates a flowchart of a procedure performed by the system of FIG. 1 when the data management framework implementing process receives identification of a non-managed resource requiring network management data collection within the data management framework, according to one embodiment disclosed herein.

FIG. 5 is a continuation of FIG. 4 of a flowchart of the steps performed by the data management framework implementing process 144-2 when it receives identification of a non-managed resource 148 requiring network management data collection within the data management framework.

In step 205, the data management framework implementing process 144-2 provides a development framework that allows an application developer to introduce network management data collection of the non-managed resource 148, into the data management framework, by identifying components associated with the development framework. The components are identified by performing at least one of:
  i) identifying the at least one data structure
  ii) creating the at least one type adapter 148
  iii) identifying the at least one key, and
  iv) implementing methods within the type adapter 148.

In step 206, the data management framework implementing process 144-2 identifies a service has been created. The service contains at least one of the components identified by the application developer, and operates to process the network management data received from the managed resource 120. The service is identified by a service name.

In step 207, the data management framework implementing process 144-2 associates the service name of the created service to a transaction involving receipt of the network management data. The service handles transactions, received from an agent 155, associated with, for example, a newly added managed resource 120. In an example embodiment, the service has already been created, and is simply moved from its original plug-in to a new plug-in, for the purpose of handling transaction data associated with a new managed resource 120.

Alternatively, in step 208, the data management framework implementing process 144-2 receives notification that a hierarchy has been identified. The hierarchy is associated with the managed resource 120, and may affect the order in which the type adapter structures 148 and key structures are created.

In step 209, the data management framework implementing process 144-2 operates the development framework so that the non-managed resource 120 becomes a managed resource 120 via the collection of network management data within the data management framework. Upon completion of the steps of creating the necessary type adapter structures 148 and key structures for a managed resource 120, and implementing methods associated with those type adapter structures 148 and key structures, the data management framework is capable of collecting network management data associated with the managed resource 120.

FIG. 6 is a flowchart of the steps performed by the data management framework implementing process 144-2 when it receives notification that a hierarchy has been identified.

In step 210, the data management framework implementing process 144-2 receives notification that a hierarchy has been identified. The hierarchy is associated with the managed resource 120. By identifying the hierarchy, an application developer also identifies any other structures that need to be created in order to add a managed resource 120 to the data management framework.

In step 211, the data management framework implementing process 144-2 validates implementation of at least one instance of the type adapter structure 148, based on the hierarchy associated with the managed resource 120. The hierarchy indicates an order in which the instance of the at least one type adapter structure 148 is implemented with respect to at least one other instance of a type adapter structure 148. An application developer identifies a hierarchy associated with the managed resource 120 and then implements type adapter structure(s) 148 according to that hierarchy.

Alternatively, in step 212, the data management framework implementing process 144-2 receives notification that at least one related type adapter structure associated with the type adapter structure 148 has been identified. Creation of the related type adapter structure is required for the network management data to be mapped from the data structure to a managed object database 161. In an example embodiment, a related type adapter structure 148 is a type adapter structure 148 that must be created in order to synchronize the network management data in the managed object database 161. However, data corresponding to a different managed resource 120 (associated with the related type adapter 148) may not be present in the data structure containing network management data related to the newly added managed resource 120.

In step 213, the data management framework implementing process 144-2 validates creation of at least one related type adapter structure 148 associated with at least one type adapter structure 148.

In step 214, the data management framework implementing process 144-2 validates modification of a method to confirm existence of at least one related type adapter structure 148 prior to creation of at least one type adapter structure 148. The data management framework implementing process 144-2 validates that all the related type adapter structures 148 exist prior to the creation of the type adapter structure 148 associated with the newly added managed resource 120.

FIG. 7 is a flowchart of the steps performed by the data management framework implementing process 144-2 when it receives notification that a hierarchy has been identified.

In step 215, the data management framework implementing process 144-2 receives notification that a hierarchy has been identified. The hierarchy is associated with the managed resource 120.

In step 216, the data management framework implementing process 144-2 receives notification that at least one foreign type adapter structure 148 associated with at least one type adapter structure 148 has been identified. The foreign type adapter structure 148 is associated with at least one other managed resource 120 that maintains a relationship with the managed resource 120 for which the data structure contains the network management data. For example, the relation between the managed resource 120 and the other managed resource 120 may relate to a data protection process that backs up data from the managed resource 120 to the other managed resource 120.

In step 217, the data management framework implementing process 144-2 validates creation of at least one foreign type adapter structure 148 associated with at least one type adapter structure 148.

Alternatively, in step 218, the data management framework implementing process 144-2 validates implementation of at least one key based on a hierarchy associated with the managed resource 120. The hierarchy indicates an order in which at least one key is implemented with respect to at least one other key. A hierarchy associated with the managed resource 120 is established. As keys associated with the managed resource 120 are created, those keys are created in an order associated with the identified hierarchy.

FIG. 8 is a continuation of the flowchart of FIG. 7 of the steps performed by the data management framework implementing process 144-2 when it validates implementation of at least one key based on a hierarchy associated with the managed resource 120.

In step 219, the data management framework implementing process 144-2 detects creation of a constructor that accepts, as a parameter, an identifying member of the key that associates the with the data structure. An application developer creates a constructor (or modifies and existing constructor) to create the key. The constructor accepts parameters that associate the key with the data structure containing network management data (associated with the managed resource 120).

In step 220, the data management framework implementing process 144-2 receives identification of a unique identifier associated with the managed resource 120, as the parameter. In an example embodiment, the unique identifier is a serial number associated with the managed resource 120.

Alternatively, in step 221, the data management framework implementing process 144-2 receives identification of at least one parent key associated with the key. The parent key and the key have a hierarchical relationship. In an example embodiment, the parameter passed into the constructor is a parent key where the key associated with the managed resource 120 is a child key of the parent key.

Figure 9:
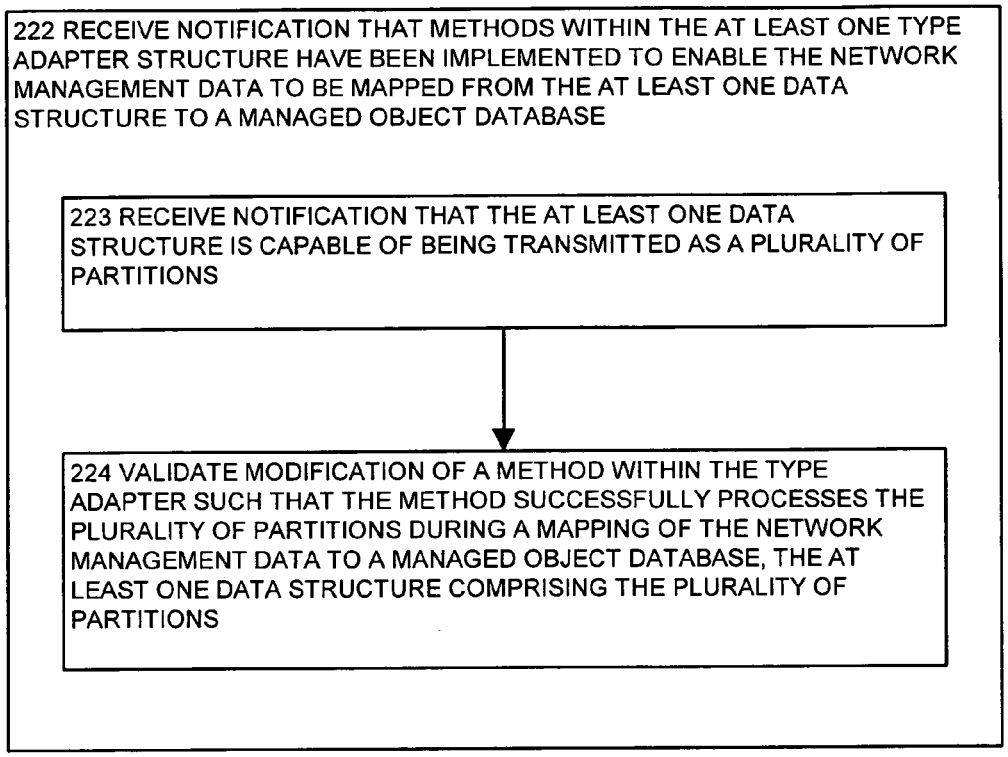
FIG. 9 illustrates a flowchart of a procedure performed by the system of FIG. 1 when the data management framework implementing process receives notification that methods within the at least one type adapter structure have been implemented to enable the network management data to be mapped from the at least one data structure to a managed object database, according to one embodiment disclosed herein.

FIG. 9 is a flowchart of the steps performed by the data management framework implementing process 144-2 when it receives notification that methods within at least one type adapter structure 148 have been implemented to enable the network management data to be mapped from least one data structure to a managed object database 161.

In step 222, the data management framework implementing process 144-2 receives notification that methods within at least one type adapter structure 148 have been implemented to enable the network management data to be mapped from least one data structure to a managed object database 161. An application developer modifies methods associated with the type adapter structures 148 and keys associated with the managed resource 120.

In step 223, the data management framework implementing process 144-2 receives notification that at least one data structure is capable of being transmitted as a plurality of partitions. In an example embodiment, an agent 155 transmits the network management data as a plurality of partitions, due to the overall size of the network management data.

In step 224, the data management framework implementing process 144-2 validates modification of a method within the type adapter 148 such that the method successfully processes the plurality of partitions during a mapping of the network management data to a managed object database 161. The data structure comprises the plurality of partitions. An application developer identifies whether the data structure is capable of transmitting network management data as a plurality of partitions, and modifies at least one method associated with the managed resource 120 (associated with the data structure) such that the data management framework can process the network management data contained within the plurality of partitions.

Other alternative arrangements disclosed herein include rearranging the processing steps explained above in the flow charts in such a way that the overall effect disclosed herein is the same. It is to be thus understood by those skilled in the art that the particular arrangement of processing steps in many instances does not specify implementation of embodiments disclosed herein. As such, those skilled in the art of software development and computer-related technologies will understand that there can be many ways and orders of representing the processing operations explained above and such alternative software code will still achieve the overall effects explained herein. In addition, embodiments disclosed herein are not limited to operation on the computer systems shown above. The agents, store processes and management server (including change manager) can operate on shared computing resources, or can be distributed among any number of computer systems. Furthermore, embodiments disclosed herein are not limited to operation in a storage area network management application, but are intended to be generally applicable to any type of network management application. Accordingly, embodiments disclosed herein are not limited to the processing arrangements explained above.

Other arrangements of embodiments disclosed herein that are disclosed herein include software programs to perform the method embodiment steps and operations summarized above and disclosed in detail below for the store process. More particularly, a computer program product is disclosed that has a computer-readable medium including computer program logic encoded thereon that when performed in a computerized device provides a associated operations of the store process, as explained herein. The computer program logic, when executed on at least one processor with a computing system, causes the processor to perform the operations (e.g., the methods) indicated herein as embodiments disclosed herein. Such arrangements disclosed herein are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments disclosed herein.

Software processes that operate in a collection of computerized devices, such as in a group of storage area network management servers, hosts or other entities can also provide the system disclosed herein. The system disclosed herein can be distributed between many software processes on several computers, or all processes such as the agent and store process could execute on a small set of dedicated computers, or on one computer alone. Though preferred embodiments provide the agent and store process execute on separate computer systems, the particular distribution of the agent and store process is not intended to be limiting.

It is to be understood that the system disclosed herein can be embodied strictly as a software program, as software and hardware, or as hardware alone. Example embodiments disclosed herein may be implemented within EMC's Control Center software application that provides management functionality for storage area network resources and in computerized devices that operate the Control Center software. Control Center is manufactured by EMC Corporation of Hopkinton, Mass., USA.

What is claimed is:

1. A computer-implemented method of enabling a data management framework to collect network management data from a managed resource, the method comprising:

receiving identification of an non-managed resource to be managed within the data management framework;

receiving identification of at least one data structure in the data management framework to contain the network management data associated with the non-managed resource to be managed within the data management framework;

receiving the network management data associated with the non-managed resource in the at least one data structure of the data management framework;

receiving notification that at least one type-adapter class structure has been created in the data management framework, the at least one type-adapter class structure created by an administrator of the data management framework, associated with the at least one data structure, and corresponding to the non-managed resource from which network management data was received;

receiving identification of at least one key common to the at least one data structure and the network management data; and receiving notification that methods within the at least one type-adapter class structure have been implemented to enable the network management data to be mapped from the at least one data structure to a managed object database enabling the data management framework to collect network management data from the previously non-managed resource as a managed resource.

2. The method of claim 1 comprising:

providing a development framework that allows an application developer to introduce network management data collection of the non-managed resource, into the data management framework, by identifying components associated with the development framework, the components identified by performing at least one of:
 i) identifying the at least one data structure;
 ii) creating the at least one type-adapter class;
 iii) identifying the at least one key; and
 iv) implementing methods within the at least one type-adapter class; and operating the development framework so that the non-managed resource becomes a managed resource via the collection of network management data within the data management framework.

3. The method of claim 2 wherein providing a development framework that allows an application developer to introduce network management data collection of the non-managed resource comprises:

identifying a service has been created, the service containing at least one of the components identified by the application developer, the service operating to process the network management data received from the managed resource, the service identified by a service name; and associating the service name to a transaction involving receipt of the network management data.

4. The method of claim 2 wherein providing a development framework that allows an application developer to introduce network management data collection of the non-managed resource comprises:

receiving notification that a hierarchy has been identified, the hierarchy associated with the managed resource.

5. The method of claim 4 wherein providing a development framework that allows an application developer to introduce network management data collection of the non-managed resource comprises:

validating implementation of at least one instance of the at least one type-adapter class structure based on the hierarchy associated with the managed resource, the hierarchy indicating an order in which the at least one instance of the at least one type-adapter class structure is implemented with respect to at least one other instance of the at least one type-adapter class structure.

6. The method of claim 4 wherein providing a development framework that allows an application developer to introduce network management data collection of the non-managed resource comprises:

receiving notification that at least one related type-adapter class structure associated with the at least one type-adapter class structure has been identified, creation of the at least one related type-adapter class structure required for the network management data to be mapped from the at least one data structure to a managed object database; and validating creation of the at least one related type-adapter class structure associated with the at least one type-adapter class structure.

7. The method of claim 6 wherein validating creation of the at least one related type-adapter class structure associated with the at least one type-adapter class structure comprises:

validating modification of a method to confirm existence of the at least one related type-adapter class structure prior to creation of the at least one type-adapter class structure.

8. The method of claim 4 wherein providing a development framework that allows an application developer to introduce network management data collection of the non-managed resource comprises:

receiving notification that at least one foreign type-adapter class structure associated with the at least one type-adapter class structure has been identified, the at least one foreign type-adapter class structure associated with at least one other managed resource that maintains a relationship with the managed resource for which the at least one data structure contains the network management data; and validating creation of the at least one foreign type-adapter class structure associated with the at least one type-adapter class structure.

9. The method of claim 4 wherein providing a development framework that allows an application developer to introduce network management data collection of the non-managed resource comprises:

validating implementation of the at least one key based on a hierarchy associated with the managed resource, the hierarchy indicating an order in which the at least one key is implemented with respect to at least one other key.

10. The method of claim 9 wherein validating implementation of the at least one key based on a hierarchy associated with the managed resource comprises:

detecting creation of a constructor that accepts, as a parameter, an identifying member of the at least one key that associates the at least one key with the data structure.

11. The method of claim 10 wherein detecting creation of a constructor that accepts, as a parameter, an identifying member of the at least one key that associates the at least one key with the data structure comprises:

receiving identification of a unique identifier associated with the managed resource, as the parameter.

12. The method of claim 10 wherein detecting creation of a constructor that accepts, as a parameter, an identifying member of the at least one key that associates the at least one key with the data structure comprises:

receiving identification of at least one parent key associated with the at least one key, the parent key and the at least one key having a hierarchical relationship.

13. The method of claim 1 wherein receiving notification that methods within the at least one type-adapter class structure have been implemented to enable the network management data to be mapped from the at least one data structure to a managed object database comprises:

receiving notification that the at least one data structure is capable of being transmitted as a plurality of partitions; and validating modification of a method within the type-adapter class such that the method successfully processes the plurality of partitions during a mapping of the network management data to a managed object database, the at least one data structure comprising the plurality of partitions.

14. A computerized device comprising:
a memory;
a processor;
a communications interface;
an interconnection mechanism coupling the memory, the processor and the communications interface;
wherein the memory is encoded with a data management framework implementing application that when executed on the processor is capable of implementing a data management framework on the computerized device by performing the operations of:
receiving identification of a non-managed resource to be managed within the data management framework;
receiving identification of at least one data structure in the data management framework to contain the network management data associated with a non-managed resource to be managed within the data management framework;
receiving the network management data associated with the non-managed resource in the at least one data structure of the data management framework;
receiving notification that at least one type-adapter class structure has been created in the data management framework, the at least one type-adapter class structure created by an administrator of the data management framework, associated with the at least one data structure, and corresponding to the non-managed resource from which network management data was received;
receiving identification of at least one key common to the at least one data structure and the network management data; and
receiving notification that methods within the at least one type-adapter class structure have been implemented to enable the network management data to be mapped from the at least one data structure to a managed object database enabling the data management framework to collect network management data from the previously non-managed resource as a managed resource.

15. The computerized device of claim 14 wherein the computerized device is capable of performing the operation of:
providing a development framework that allows an application developer to introduce network management data collection of the non-managed resource, into the data management framework, by identifying components associated with the development framework, the components identified by performing at least one of:
i) identifying the at least one data structure;
ii) creating the at least one type-adapter class;
iii) identifying the at least one key; and
iv) implementing methods within the at least one type-adapter class; and
operating the development framework so that the non-managed resource becomes a managed resource via the collection of network management data within the data management framework.

16. The computerized device of claim 15 wherein when the computerized device performs the operation of providing a development framework that allows an application developer to introduce network management data collection of the non-managed resource, the computerized device is capable of performing the operation of:
identifying a service has been created, the service containing at least one of the components identified by the application developer, the service operating to process the network management data received from the managed resource, the service identified by a service name; and
associating the service name to a transaction involving receipt of the network management data.

17. The computerized device of claim 15 wherein when the computerized device performs the operation of providing a development framework that allows an application developer to introduce network management data collection of the non-managed resource, the computerized device is capable of performing the operation of:
receiving notification that a hierarchy has been identified, the hierarchy associated with the managed resource.

18. The computerized device of claim 17 wherein when the computerized device performs the operation of providing a development framework that allows an application developer to introduce network management data collection of the non-managed resource, the computerized device is capable of performing the operation of:
validating implementation of at least one instance of the at least one type-adapter class structure based on the hierarchy associated with the managed resource, the hierarchy indicating an order in which the at least one instance of the at least one type-adapter class structure is implemented with respect to at least one other instance of the at least one type-adapter class structure.

19. The computerized device of claim 14 wherein when the computerized device performs the operation of receiving notification that methods within the at least one type-adapter class structure have been implemented to enable the network management data to be mapped from the at least one data structure to a managed object database, the computerized device is capable of performing the operation of:
receiving notification that the at least one data structure is capable of being transmitted as a plurality of partitions; and
validating modification of a method within the type-adapter class such that the method successfully processes the plurality of partitions during a mapping of the network management data to a managed object database, the at least one data structure comprising the plurality of partitions.

20. A non-transitory computer readable storage medium having computer programming logic encoded thereon that when executed on a processor in a computerized device provides data management framework implementation, the medium comprising:
Instructions for receiving identification of a non-managed resource to be managed within the data management framework;
instructions for receiving identification of at least one data structure in the data management framework to contain the network management data associated with the non-managed resource to be managed within the data management framework;
instructions for receiving the network management data associated with the non-managed resource in the at least one data structure of the data management framework;

instructions for receiving notification that at least one type-adapter class structure has been created in the data management framework, the at least one type-adapter class structure created by an administrator of the data management framework, associated with the at least one data structure, and corresponding to the non-managed resource from which network management data was received;

instructions for receiving identification of at least one key common to the at least one data structure and the network management data; and instructions for receiving notification that methods within the at least one type-adapter class structure have been implemented to enable the network management data to be mapped from the at least one data structure to a managed object database enabling the data management framework to collect network management data from the previously non-managed resource as a managed resource.

* * * * *